United States Patent [19]

Skutnik et al.

[11] Patent Number: 5,112,658
[45] Date of Patent: May 12, 1992

[54] COATING COMPOSITIONS FOR GLASS CONTAINERS

[75] Inventors: Bolesh J. Skutnik, New Britain; Harry L. Brielmann, Jr., West Hartford, both of Conn.

[73] Assignee: Ensign-Bickford Optics Company, Avon, Conn.

[21] Appl. No.: 272,133

[22] Filed: Nov. 16, 1988

[51] Int. Cl.$^5$ .............................................. B65D 11/16
[52] U.S. Cl. .................................. 428/34.6; 215/12.2; 215/DIG. 6
[58] Field of Search ................ 428/34.6, 426, 429, 428/430, 435, 442; 215/12.2, DIG. 6

[56] References Cited

U.S. PATENT DOCUMENTS

| | | | |
|---|---|---|---|
| 3,772,061 | 11/1973 | McCoy et al. | 428/441 |
| 3,801,361 | 4/1974 | Kitaj | 428/429 |
| 3,873,352 | 3/1975 | Kitaj | 428/429 |
| 4,065,589 | 12/1977 | Lenard et al. | 428/430 |

*Primary Examiner*—James J. Seidleck
*Attorney, Agent, or Firm*—Fishman, Dionne & Cantor

[57] ABSTRACT

Coated glass containers having a surface cured composition which is the reaction product of at least one ethylenically unsaturated monoene, a polyene and a curing initiator. The coating is bonded to the exterior or interior surface of a glass container to increase hardness and strength.

27 Claims, No Drawings

COATING COMPOSITIONS FOR GLASS CONTAINERS

FIELD OF THE INVENTION

The present invention relates to curable exterior protective coating compositions for glass containers which include at least one monoene, a polyene and a curing initiator. As desired, additives of various structures may be incorporated into the carbon chains of the monoene and/or polyene components to provide such properties as increased strength, water resistance, thermal stability and optical qualities to the resultant compositions.

RELATED PATENT

This application includes subject matter that formed a part of application Ser. No. 722,828, filed Apr. 12, 1985, now U.S. Pat. No. 4,707,076 issued Nov. 17, 1987.

BACKGROUND OF THE INVENTION

It is well known that functional protective overlayers of curable synthetic organic coating compounds are formed with thiols or polythiols as necessary components. The thiol or polythiols components of the prior art compounds provide for the formation of solid, self-supporting cured compounds under ambient conditions in the presence of a free radical generator or under high energy irradiation. Illustrative of such known compounds are those disclosed in U.S. Pat. Nos. 4,125,644, 3,787,303, 3,662,022 and 3,864,229.

Glass containers are produced by two general methods that cause surface flaws to develop which significantly decrease mechanical strength of the container. In one method, the container is formed by forcing air into molten glass so that the outside surface of the glass is pressed against a mold. Flaws consequently predominate on the exterior surface of the finished product. Another method is to insert a metal die into molten glass resulting in flaws on the interior glass surface. Glass containers produced by either method are subject to exterior damage during subsequent handling after the forming process is complete.

OBJECTS OF THE INVENTION

Coatings for glass bottles have been the subject of much attention in the industry. Mechanical weakening can occur in glass as a result of flaws and scratches in the surface, even those of microscopic size, and as a result of moisture which attacks the bonding of the silica and other compounds which may be present in the glass.

In glass bottle technology, certain metal oxide and organic coating combinations, for example, tin oxide/polyethylene, have been used to reduce frictive damage in bottle contact and provide a barrier to moisture. While those coatings reduce stress in bottle contact and provide some protection from moisture, they do little to improve the strength of bottles already damaged and weakened, and also provide some difficulties in printing over the coatings.

It is an object of the present invention to provide a new and useful class of exterior or interior coating compositions which, when cured, provide enhanced physical, bonding and mechanical properties and consistency of these properties to glass containers.

It is still another object of the present invention to provide a composition which can form a highly cross-linked structure by exposure to high energy irradiation, thermal curing or moisture curing.

Still another object of this invention is to provide a coating composition with improved hydrolytic stability and adhesion promoting properties with oxidizable substrates.

It is still another object of the invention to provide curable coating compositions which do not require a thiol or polythiol as a synergist.

Other objects will be in part obvious and in part pointed out in more detail hereinafter.

A better understanding of the objects, advantages, features, properties and relations of the invention will be obtained from the following detailed description which sets forth certain illustrative embodiments and is indicative of the various ways in which the principles of the invention are employed.

SUMMARY OF THE INVENTION

The curable compositions disclosed in this invention have as the main components: (1) at least one monoene; (2) polyene; and (3) a curing initiator, such as a UV photoinitiator. The percent levels of each of these components can be varied relative to one another over a wide range. Organo functional groups can be integrated into the carbon chains of these main components to form compositions having a wide variety of applications. The components are combined and cured in an efficient manner without requiring a thiol or polythiol to act as the synergist for the composition. Curing mechanisms include radiation, thermal and moisture curing. The glass substrate is preferably a silica-containing glass and may be in a wide variety of shapes including bottles, plates, tubes and other glass containers.

One application of these general compositions to fiber optic cores is U.S. Pat. No. 4,707,076 granted to the inventors named herein.

DETAILED DESCRIPTION OF THE INVENTION AND PREFERRED EMBODIMENTS

The curable compositions may be composed of polymerizable monoenes including mixtures of two, three or more monoenes. As used herein, monoenes refer to simple and complex ethylenically unsaturated species having one reactive carbon-to-carbon bond per average molecule. Examples of operable monoenes are the mono unsaturated esters, ethers, amines and silanes, esters of mono unsaturated acids such as acrylic acid, methacrylic acid, butenoic acid, crotonic acid, itacontic acid, maleic acid, ethacrylic acid and the salts thereof, acrylates and methacrylates, along with the esters of mono unsaturated alcohols such as allylester and vinylesters. Specifically, monoenes useful herein include, but are not limited to, dimethyl itaconate, 1H, 1H, 11 H-perfluoroundecyl methyl itaconate, di-1H, 1H, 11H perfluoroundecyl maleate, perfluoroundecyl crotonate, crotyl perfluoro ocatanoate, isobornyl acrylate, isocyanatoethyl methacrylate, iso-octylacrylate, n-lauryl acrylate, butanediol acrylate, decyl acrylate, perfluorooctyl acrylate trihydro-eicosafluoroundecyl acrylate, gamma-methacryloxypropyltrimethoxysilane, 2-hydroxy-2methyl-1phenylpropan-1-one, 3-methacryloxypropyl-tris (methoxyethoxy-silane) and the urethane of isocyanatoethyl methacrylate and the like, including blends thereof. The various monoenes may be obtained commercially or may be readily prepared from commercially available reactants. Useful weight percentages of the composition for the monoene component are from about 10.0% to about 95.0%, with preferred a range of about 10.0% to about 75.0%.

The properties of the compositions can be modified by mixing two or more monoenes or by the integration of various functional groups into the monoene basic structure. The composition will then be made up of differing functional units and the properties of the resultant composition can be varied in this way.

This can be done, for instance, by including in the composition a halogenated monoene such as a fluorinated monoene, can be readily incorporated into the composition when a low coefficient of friction is desired; the addition of a fluorinated compound will increase the thermal stability and electric resistivity of the resultant composition.

Yet another example of the versatility of the composition of this invention is illustrated in Table I.

Table I indicates successful combinations of the composition invention wherein the resultant hardness of the composition (after curing) can be modified by the choice of components and/or the percentages of components. Specifically, the test results shown in Table I illustrates the results of the hardness testing when the monoene component was varied by several different methods, such as weight percent, chemical structure and balancing the combinations of monoenes, to produce compositions of varying hardness.

TABLE I

| | Weight Percentage | Compound Composition | |
|---|---|---|---|
| | A. Constant percentage of monoene, different combinations of monoene. | | |
| | | | A-2 Scale Shore Hardness |
| 1. | 90.0 | isodecyl acrylate | 31.0 |
| | 9.3 | trimethylolpropane triacrylate | |
| | 0.7 | 2-hydroxy-2-methyl-1-phenylpropan-1-one | |
| 2. | 68.0 | isodecyl acrylate | 42.0 |
| | 23.0 | isobornyl acrylate | |
| | 9.3 | trimethylolpropane triacrylate | |
| | 0.7 | 2-hydroxy-2-methyl-1-phenylpropan-1-one | |
| 3. | 23.0 | isodecyl acrylate | 93.0 |
| | 68.0 | isobornyl acrylate | |
| | 9.3 | trimethylolpropane triacrylate | |
| | 0.7 | 2-hydroxy-2-methyl-1-phenylpropan-1-one | |
| 4. | 90.0 | isbornyl acrylate | 94.7 |
| | 9.3 | trimethylopropane triacrylate | |
| | 0.7 | 2-hydroxy-2-methyl-1-phenylpropan-1-one | |
| | B. Different Percentage of Monoene and Combinations of monoenes. | | |
| | | | A-2 Scale Shore Hardness |
| 1. | 73.8 | isodecyl acrylate | 78.0 |
| | 25.4 | trimethylopropane triacrylate | |
| | 0.7 | 2-hydroxy-2-methyl-1-phenylpropan-1-one | |
| 2. | 55.0 | isodecyl acrylate | 83.0 |
| | 19.0 | isobornyl acrylate | |
| | 25.4 | trimethylolpropane triacrylate | |
| | 0.7 | 2-hydroxy-2-methyl-1-phenylpropan-1-one | |
| 3. | 55.0 | isobornyl acrylate | 90.0 |
| | 19.0 | isodecyl acrylate | |
| | 25.35 | trimethylolpropane triacrylate | |
| | 0.7 | 2-hydroxy-2-methyl-1-phenylpropan-1-one | |
| 4. | 73.8 | isobornyl acrylate | 94.0 |
| | 25.4 | trimethylolpropane triacrylate | |
| | 0.7 | 2-hydroxy-2-methyl-1-phenylpropan-1-one | |
| | C. Different Percentage of Same Monoene. | | |
| | | | D-2 Scale Shore Hardness |
| 1. | 90.0 | isodecyl acrylate | 6.0 |
| | 9.3 | trimethylolpropane triacrylate | |
| | 0.7 | 2-hydroxy-2-methyl-1-phenylpropan-1-one | |
| 2. | 73.8 | isodecyl acrylate | 25.0 |
| | 25.5 | trimethylolpropane triacrylate | |
| | 0.7 | 2-hydroxy-2-methyl-1-phenylpropan-1-one | |
| 3. | 50.0 | isodecyl acrylate | 70.0 |
| | 49.3 | trimethylolpropane triacrylate | |
| | 0.7 | 2-hydroxy-2-methyl-1-phenylpropan-1-one | |
| 4. | 10.0 | isodecyl acrylate | 82.0 |
| | 89.3 | trimethylolpropane triacrylate | |
| | 0.7 | 2-hydroxy-2-methyl-1-phenylpropan-1-one | |

The hardness of the compositions was determines by the Shore Hardness test under either the A-2 or D-2scale. As can be seen from the above information, the hardness is controlled by several different factors to produce tailored compositions for a desired use, Moreover, the results of Table I illustrate the fact that the other properties of compositions, mentioned above, can be tailored to obtain desires characteristics for the composition on a chosen substrate.

Other organofunctional compounds or complexes can be substituted in the basic monoene component. By substituting a silane compound as a coupling agent, compositions suitable for use in bonding substrate materials can be produced. Alkoxy or hydroxy functional group may also be integrated into the monoene or polyene component to generate bonding to glass. Examples of such organofunctional silanes include gamma-methacryloxypropyltrimethoxy silane, 3-cyanopropyl triethoxy silane, gamma-glycidoxypropyl trimethoxy silane, trimethoxysilypropyl diethylene triamine, 3-chloropropyl trimethoxy silane, alkyl-alkoxy derivatives, and preferably gamma-mercaptopropyltrimethoxy silane, vinyltrimethoxy silane, m, p-styrylethylenetrimethoxy silane, allyl triethoxy silane, diphenylvinylethoxy silane, and alkoxy derivatives.

Similarly, other functional groups can be added to modify the properties of any given composition having the basic three components. The flame retardancy of the composition can be increased by the addition of fluorine and/or other halogens, while the water repulsion of compositions can be enhanced by incorporating alkyl chains of greater than six carbon lengths.

Additionally, compositions to be cured in accord with the present invention may, if desired, include such additives as antioxidants, inhibitors, activators, fillers, pigments, dyes, antistatic agents, flame retardant agents, thickeners, surface-active agents, viscosity modifiers, plasticizers and the like within the scope of the invention. The type and concentrations of the additives, and/or combinations must be selected with care so that the final compositions has the desired characteristics while remaining curably by free radical mechanisms or by other well-known curing means such as moisture curing.

The polyene components may be a simple or complex organic compound having a multiplicity of functional groups per molecule, and as with the monoene components, may be tailored by substitutions of organo functional compounds for controlling the resultant characteristics of the composition. The term polyene is used herein to define ethylenically unsaturated compounds which contain at least 2 or more reactive unsaturated carbon-to-carbon bonds per molecule. The preferred polyenes are characterized by the ability to quickly thermoset upon exposure to the curing activity. Preferably the polyene component has two or more reactive unsaturated carbon-to-carbon bonds located terminally or pendant from the main carbon chain.

Examples of such polyenes include, divinyl benzene, diallyl esters of polycarboxylic acids, triallyl terephthalate, N, N'-methylene diacrylamide, diallyl maleate, diallyl fumatrate, divinyl adipate, diallyl succinate, divinyl ether, the divinyl ethers of ethylene glycol or diethylene glycol diacrylate, polyethylene glycol diacrylates or methacrylates and the like of the aforementioned cross linking monoenes. The most preferred include trimethylolpropane triacrylate, triallyl cyanurate, pentaerythritol acrylate, 1, 3 butanediol diacrylate and 1, 6 hexanediol acrylate. Other specific examples of commercially available polyenes include, but are not limited to allyl acrylate, allyl methacrylate and N, N'-methylene diacrylamide, and divinylbenzene and the like. Another class of polyenes which are particularly useful are the polyurethanes which contain sufficient reactive carbon-to-carbon locations for the placement of other functional or additive groups.

Useful ranges of the polyene component are from about 2.0% to about 70.0% of the weight percent of compositions, and preferably from about 10.0% to about 60.0%.

Particlly any curing initiator agent or curing rate accelerator can be used. UV curing is often preferred, although it is recognized that free radical generating reagents may be employed as well as high energy radiation bombardment and thermal curing. Curing rate accelerators useful herein include 2-hydroxy-2-methyl-1phenyl propan-1-one, methyl, ethyl, propyl or isobutyl ethers of benzoin and other analogs, and 2,2-dimethoxy, 2-phenyl-acetophenone, The curing agent may be included in any effective amount; generally, suitable levels are from about 0.4% to about 20% of the weight composition of composition, and preferably from about 0.7% percent by weight of the compositions to about 10%. If thermal curing is employed, an appropriate initiator such as a peroxide or Azo compound may be added.

The following Table II indicates representative examples of successful combinations formed in accordance with this invention.

TABLE II

| Components/Composition | 1 | 2 | 3 | 4 | 5 | 6 | 7 | 8 | 9 | 10 | 11 | 12 | 13 |
|---|---|---|---|---|---|---|---|---|---|---|---|---|---|
| Dimethyl Itaconate | 46.1 | 56.3 | | | | | | | | | | | |
| 1H, 1H, 11H-Perfluoroundecyl Methyl Itaconate | | | 37.8 | 50.9 | | | | | | | | | |
| Di-1H, 1H, 11H-Perfluoroundecyl Maleate | | | | | 56.3 | | | | | | | | |
| Perfluoroundecyl Crotonate | | | | | | 50.0 | 56.3 | | | | | | |
| Crotyl Perfluoro Octanoate | | | | | | | | | | | | | |
| Acrylate FX-13 | | | | | | | | 66.7 | 36.2 | | | | |
| Methacrylate FX-14 | | | | | | | | | | | | | |
| Isobornyl Acrylate | | | 13.1 | | | | | | | | | | |
| Isocyanato Ethyl Methacrylate | | | | | | | | | | 36.0 | 73.0 | | |
| Iso-Octyl Acrylate | | | | | | | | | | | | 71.8 | 36.1 |
| Urethane of Isocyanatomethacrylate | | | | | | | | | | | | | |
| 1H, 1H, 11H-Bicosafluoroundecyl Acrylate | | 18.8 | | | 18.8 | | 18.8 | | 36.2 | 36.0 | | | 36.1 |
| trimethylolpropane triacrylate | 49.8 | 22.8 | 46.5 | 46.5 | 22.8 | 45.5 | 22.8 | 31.3 | 25.4 | 25.7 | 24.5 | 23.9 | 25.4 |
| γ-Methacryloxypropyltrimethoxy silane | 2.8 | 1.5 | 1.8 | 1.7 | 1.5 | 3.0 | 1.5 | 1.3 | 1.5 | 1.4 | 1.5 | 2.9 | 1.5 |
| 2-hydroxy-2-methyl-1-phenylpropan-1-one | 1.4 | .75 | .9 | .9 | .8 | 1.5 | .75 | .7 | .7 | 1.0 | .9 | 1.4 | 1.0 |
| 3-Methacryloxypropyltris (methoxy ethoxy silane) | | | | | | | | | | | | | |
| | 14 | 15 | 16 | 17 | 18 | 19 | 20 | 21 | 22 | 23 | 24 | 25 | 26 | 27 |
| Dimethyl Itaconate | | | | | | | | | | | | | | |
| 1H, 1H, 11H-Perfluoroundecyl Methyl Itaconate | | | | | | | | | | | | | | |
| Di-1H, 1H, 11H-Perfluoroundecyl Maleate | | | | | | | | | | | | | | |
| Perfluoroundecyl Crotonate | | | | | | | | | | | | | | |
| Acrylate FX-13 | | | | | | | | | | | | | | |
| Methacrylate FX-14 | | | | | | | | | | | | | | |
| Isobornyl Acrylate | | | 47.0 | | 88.0 | | | | | | | | | |
| Isocyanato Ethyl Methacrylate | | | | | | | | | | | | | | |
| Iso Octyl Acrylate | | | | | | | | | | | | | | |
| Urethane of Isocyanatomethacrylate | | 71.1 | | | | | | | | | | | | |
| 1H, 1H, 11H-Bicosafluoroundecyl Acrylate | 90.4 | | 47.0 | 10.0 | 89.0 | | 73.7 | 73.7 | 73.7 | 73.7 | 73.7 | | | |
| Croytyl Perfluoro Octanoate | | | | | | | | | | | | 48.0 | 48.3 | 39.8 |
| Allyl Acrylate | | | | | | | | | | | | | 0.7 | 13.9 |
| 5-Hexenyldimethylchlorosilane | | | | | | | | | 1.7 | | | | | |
| N(3 acryloxy-2-Hydroxy Propyl) 3 Amino propyltriethoxy silane | | | | | | | | | | | 1.7 | | | |
| 3-Methacryloxy Propyl-dimethyl Chloro-silane | | | | | | | | 1.7 | | | | | | |
| 1,3,5-Trivinyl 1,1,3,5,5-trimethyltrisiloxane | | | | | | | | | | 1.7 | | | | |
| 3-Methacryl propyl-tris Methoxy ethoxy | | | | | | 1.7 | | | | | | | | |

TABLE II-continued

| Components/Composition | | | | | | | | | | | | | | |
|---|---|---|---|---|---|---|---|---|---|---|---|---|---|---|
| silane | | | | | | | | | | | | | | |
| trimethylolpropane triacrylate | 6.3 | 23.7 | 3.1 | 86.0 | 5.7 | 8.7 | 23.8 | 23.8 | 23.8 | 23.8 | 23.8 | | | 38.0 |
| γ-Methacryloxypropyltrimethoxy silane | 2.1 | 2.8 | 1.9 | 3.4 | 3.7 | 1.9 | | | | | | 3.8 | 6.2 | 4.8 |
| 3-Methacryloxy propyl tris (methoxy ethoxy silane) | 1.2 | 2.4 | 0.9 | 1.1 | 1.7 | 1.7 | 0.7 | 0.7 | 0.7 | 0.7 | 0.7 | 1.4 | 1.4 | 3.2 |
| Triallyl cyanurate | | | | | | | | | | | | 47.0 | 43.4 | |

| Components/Composition | 28 | 29 | 30 | 31 | 32 | 33 | 34 | 35 | 36 | 37 |
|---|---|---|---|---|---|---|---|---|---|---|
| Dimethyl Itaconate | | | | | | | | | | |
| 1H, 1H, 11H-Perfluoroundecyl Methyl Itaconate | | | | | | | | | | |
| D1-1H, 1H, 11H-Perfluoroundecyl Maleate | | | | | | | | | | |
| Perfluoroundecyl Crotane | | | | | | | | | | |
| Acrylate FX-13 | | | | | | | | | | |
| Methacrylate FX-14 | | | | | 50.0 | 25.0 | | | | |
| Isobornyl Acrylate | | | | | | | | | | |
| Isocyanato Ethyl Methacrylate | | | | | | | | | | |
| Iso-Octyl Acrylate | | | | | | | | | | |
| Urethane of Isocyanomethacrylate 1H, 1H, 11H-Bicosafluoroundecyl Acrylate | | | | | | | 25.0 | 50.0 | 50.0 | 74.0 |
| Crotyl Perfluoro Octanoate | 28.7 | | | 22.0 | 14.6 | | | | | |
| Allyl Acrylate | 36.0 | | | 27.5 | 35.0 | | | | | |
| Octyl Crotonate | | 48.5 | 50.0 | | | | | | | |
| trimethylolpropane triacrylate | | 46.0 | 45.0 | | 17.6 | 45.5 | 45.5 | 46.0 | | 24.0 |
| γ-Methacryloxypropyltrimethoxy silane | 2.9 | 3.9 | 3.0 | 1.3 | 2.5 | 3.0 | 3.0 | 3.0 | 3.0 | |
| 2-hydroxy-2-methyl-1-phenylpropantone | 1.7 | 1.5 | 1.5 | 1.5 | 15.0 | 1.5 | 1.5 | 1.5 | 1.5 | 1.7 |
| 3-Methacryloxy propyl tris (methoxy ethoxy silane) | | | | | | | | | | |
| Triallyl Cyanurate | 30.7 | | 48.0 | 15.0 | | | 46.0 | | | |

The following examples are also illustrative of the present invention and are not intended to limit the scope thereof.

EXAMPLE I

A three component curable system was prepared as follows:

A receptacle suitable for preparing a 10 gram batch, equipped with a stirring bar, was charged with the following components in weight percentage in sequence:

vinyl trimethoxy silane: 12.0%
trimethylolpropane triacrylate: 87.0%
2-hydroxy-2-methyl-1-phenylpropan-1-one: 1.0%

After the addition was completed the compositions was thoroughly mixed and UV cured on a substrate.

EXAMPLE 2

The procedures of Example 1 were substantially repeated except a fourth component was added the following components was added to the batching receptacle.

allylphenylether: 10.0%
gamma-methacryloxypropyltrimethoxy silane: 2.0%
trimethylolpropane triacrylate: 87.0%
2-hydroxy-2methyl-1-phenylpropan-1one: 1.0%

EXAMPLE 3

The procedures of Example 2 were substantially repeated except the following components were added to the receptacle.

lauryl acrylate: 10.0%
trimethylolpropane triacrylate: 87.0%
gamma-methacryloxypropyltrimethoxy silane: 2.0%
2-hydroxy-2-methyl-1-phenylpropan-1-one: 1.0%

After the monoene, polyene and curing initiator components are combined and blended, and if desired, additional functional materials (as may be desired), the curable coating composition is applied to a substrate and thereafter exposed to a free radical generator such as actinic radiation to give an essentially solid overcoating to a substrate.

EXAMPLE 4

The procedures of Example 3 were substantially repeated except the following components were added to the receptacle.

n-lauryl methacrylate: 8.5%
gamma-methacryloxypropyl (trimethoxy-) silane: 1.5
1,3 Butyleneglycoldimethacrylate: 62.7
trimethylolpropaetriacrylate: 23.1
1,1 Azobis (cyanocyclohexane): 4.0
thiodiethylene bis-(3,5;-tert-butyl-4 hydroxy hydrocinnamate): 0.2

The curing reaction is preferably initiated by either UV/VIS radiation or high energy ionizing radiation. The UV radiation can be obtained by special light sources which emit significant amounts of UV light having a wavelength in the range of about 2000 to about 4000 Angstrom units. When UV radiation is used for a curing reaction, a dose of about 50 to 250 watts/in$^2$ is employed.

The curing rate of the UV curable compositions is dependent upon the intensity of UV light which initiates cross linking within the composition. UV lamp systems are available in a wide range of power output and bulb lengths to provide the desired rate for each separate application.

When UV radiation is used for curing a composition, a photosensitizer may be added to the composition.

The present curable coating compositions provide improved mechanical strength when used on a typical glass substrate such as sode lime silica container glass. Such mechanical strength factors as burst-strength, resistance to abrasion, and general container strength are significantly improved.

As will be apparent to persons skilled in the art, various modifications, adaptations and variations of the foregoing specific disclosure can be made without departing from the teachings of this invention.

I claim:

1. A container, comprising:
   a glass substrate, and
   a coating on the glass substrate, said coating being formed by curing a composition comprising:
   an ethylenically unsaturated monoene;
   an ethylenically unsaturated polyene; and
   a curing initiator.

2. The container of claim 1, wherein the glass substrate comprises silica.

3. The container of claim 1, wherein the coating is bonded to the substrate.

4. The container of claim 1, wherein the composition comprises:
   from about 10.0 weight percent to about 95.0 weight percent of the monoene;
   from about 2.0 weight percent to about 70.0 weight percent of the polyene; and
   from about 0.4 weight percent to about 20.0 weight percent of the initiator.

5. The container of claim 1, wherein the composition comprises:
   from about 10.0 weight percent to about 75.0 weight percent of the monoene;
   from about 10.0 weight percent to about 60.0 weight percent of the polyene; and
   from about 0.7 weight percent to about 10.0 weight percent of the initiator.

6. The container of claim 1, wherein the monoene comprises a mixture of two or more monoenes.

7. The container of claim 1, wherein the monoene includes an alkoxy or hydroxy functional group.

8. The container of claim 1, wherein the monoene comprises a monounsaturated ester or a monounsaturated organofunctional silane.

9. The container of claim 1, wherein the monoene is selected from the group consisting of acrylates and methacrylates.

10. The container of claim 1, wherein the monoene is selected from the group consisting of dimethyl itaconate, 1H, 1h, 11h-perfluorodecyl methyl itaconate, di-1H, 1H, 11H perfluoroundecyl maleate, perflourodecyl crotonate, crotyl perfluoro octanoate, isobornyl acrylate, isocyanatoethyl methacrylate, isooctylacrtylate, n-lauryl acrylate, butanediol acrylate, decyl acrylate, perfluorooctyl acrylate, trihydroeicosafluoroundecyl acrylate, gamma-methacryloxypropyltrimethoxysilane, 3-methacryloxypropyl-tris (methoxyethoxy-silane), the urethane of isocyanatoethyl methacrylate and mixtures thereof.

11. The container of claim 8, wherein the monounsaturated organofunctional silane is selected from the group consisting of gamma-methacryloxypropyl trimethoxy silane. vinyltrimethoxy silane, m, p-styrylethylenetrimethoxy silane, allyl triethoxy silane and diphenylvinylethoxy silane.

12. The container of claim 1 wherein the polyene comprises a main carbon chain and two or more reactive groups, wherein each of said groups comprises an unsaturated carbon to carbon bond and wherein each of said reactive groups is a terminal group of or pendant group from said main carbon chain.

13. The container of claim 1, wherein the polyene is selected from the group consisting of divinyl benzene, triallyl terephthalate. N, N'-methylene diacrylamide, diallyl maleate, diallyl fumarate, divinyl adipate, diallyl succinate, divinyl ether, the divinyl ether of ethylene glycol, diethylene glycol diacrylate, polyethylene glycol dimethacrylates, polyethylene glycol diacrylates, trimethylolpropane triacrylate, triallyl cyanurate, pentaerythritol acrylate, 1, 3 butanediol diacrylate and 1, 6 hexanediol acrylate, allyl acrylate, allyl methacrylate, N, N'-methylene diacrylamide, and divinylbenzene.

14. The container of claim 1, wherein the polyene comprises a polyurethane having reactive carbon-to-carbon bonds.

15. The container of claim 1, wherein the polyene includes an alkoxy or hydroxy functional group.

16. The container of claim 1, wherein the curing initiator is selected from the group consisting of 2-hydroxy-2-methyl-1phenyl propan-1-one, methyl, ethyl, propyl or isobutyl ethers of benzoin and 2, 2-dimethoxy, 2-phenyl-acetophenone.

17. The container of claim 1, wherein the composition is cured by subjecting the composition to UV radiation.

18. The coated glass container of claim 1 wherein said composition is bonded to the exterior surface of the glass container.

19. The coated glass container of claim 1 wherein said composition is bonded to the interior surface of the glass of the container.

20. The coated glass container of claim 1 wherein said composition consisting essentially of about 10.0 to about 95.0 weight percent of the ethylenically unsaturated monoene, about 2.0 to about 70 weight percent of the ethylenically unsaturated polyene, and about 0.4 to about 20 weight percent of the curing initiator.

21. The coated glass container of claim 1 wherein said composition consisting essentially of about 10.0 to about 75.0 weight percent by weight of the ethylenically unsaturated monoene, about 10.0 to about 60.0 weight percent of the ethylenically unsaturated polyene by weight, about 0.7 to about 10.0 percent by weight of the curing initiator.

22. The coated glass container of claim 1 wherein the ethylenically unsaturated monoene or polyene contains a silane functional group.

23. The coated glass container of claim 1 wherein the ethylenically unsaturated monoene or polyene contains an alkoxy or hydroxy functional group.

24. The coated glass container of claim 1 wherein said ethylenically unsaturated monoene component contains alkyl groups of six carbon lengths or longer.

25. The coated glass container of claim 1 wherein the ethylenically unsaturated polyene is selected from polyurethanes.

26. The coated glass container of claim 1 wherein said monoene or polyene includes an acrylate.

27. The coated glass container of claim 1 wherein said monoene or polyene includes a methacrylate.

* * * * *